Nov. 26, 1968 S. G. McCARTHY 3,413,483
ELECTRO-OPTICAL EXPONENTIAL WEIGHTING INTEGRATOR
Filed April 3, 1967
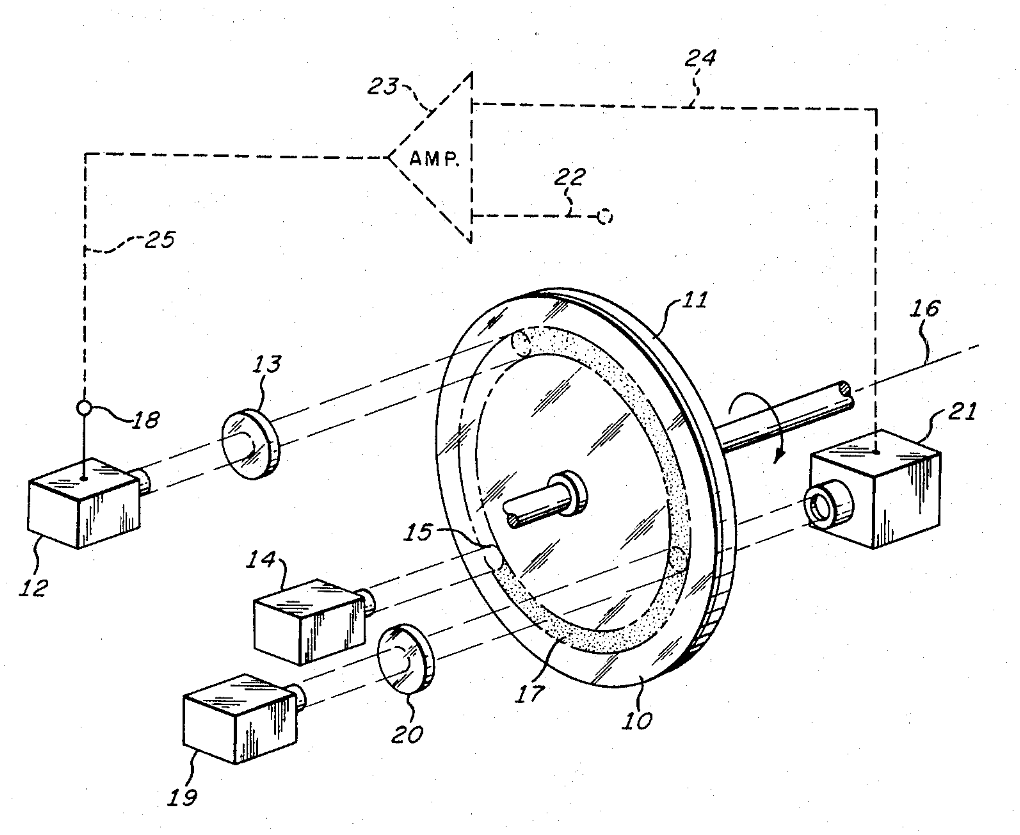
INVENTOR.
STEPHEN G. MC CARTHY
BY
S. C. Yeaton
ATTORNEY United States Patent Office 3,413,483
Patented Nov. 26, 1968

3,413,483
ELECTRO-OPTICAL EXPONENTIAL WEIGHTING INTEGRATOR
Stephen G. McCarthy, Dobbs Ferry, N.Y., assignor to Sperry Rand Corporation, a corporation of Delaware
Filed Apr. 3, 1967, Ser. No. 627,727
10 Claims. (Cl. 250—226)

ABSTRACT OF THE DISCLOSURE

An electro-optical exponential weighting integrator utilizing a bistable recording medium that is movable in succession past write, read and erase mechanisms which may be operated either separately or in combination with accessory electronic components to feedback a fractional amount of the recorded signal in synchronism with an instant input signal so as to produce an updated recorded signal consisting of the instant input signal and an amplitude attenuated replica of the previously recorded signal.

*Background of the invention*

The present invention relates to electro-optical data processing system and more particularly to an electro-optical exponential weighting integrator.

Signal integration for the purpose of enhancing signal-to-noise ratio is well known and extensively used in electronic systems. The integrator may weight successive signals either equally or unequally, the latter technique being exemplified by RC circuits wherein the signals are exponentially weighted so that past signals are reduced in significance as the integration process continues. Although equal weighting provides better signal-to-noise ratio enhancement, exponential weighting may be prefrered when, for example, the signal data is capable of changing rapidly because in this case the most recent data is generally considered the most important. Optical integrating devices, on the other hand, are inherently linear devices which weight all signals equally. As a result the capability for according greater weight to the most recent data is not available. Moreover, equal weighting causes the integration stage of an electro-optical data processing system to saturate very rapidly.

*Summary of the invention*

The present invention overcomes the aforementioned limitations of prior art optical integrating mechanisms by providing an electro-optical integrator which performs exponential weighting. In a preferred embodiment of the invention continuous exponential weighting integration is accomplished by the provision of a bistable recording medium upon which a signal is written as the recording medium moves past a write mechanism. The recorded segment then moves successively past read and erase mechanisms which respectively readout and reduce the amplitude of the recorded (integrated) signal. Thereafter the amplitude attenuated recording returns to a position adjacent the write mechanism where an instant input signal is added to it to update the integrated signal.

*Brief description of the drawing*

For a more thorough understanding of the invention, reference should be made to the following detailed specification and the accompanying drawing which is a schematic perspective of a continuous exponential weighting integrating device employing opto-mechanical feedback.

*Description of the preferred embodiment*

In the illustrative embodiment a photochromic material is utilized as a recording medium. This material is characterized by its variable sensitivity to electromagnetic radiation of different wavelengths in the visible and ultraviolet regions. More specifically, it is comparatively unaffected by green light but becomes relatively more transparent and opaque when exposed to yellow and ultraviolet light respectively, the change in relative opacity being proportional to the energy of the impinging light beam. As a result, photochromic material is useful in electro-optical data processors because information may be recorded and erased simply by illuminating the photochromic with light of the proper wavelength to change its relative opacity in a desired manner. Moreover, photochromics make it possible to operate in real time.

In most real time systems wherein the information is first written on the photochromic, then processed and finally erased so that the photochromic may be reused, writing is accomplished by moving the photochromic past a stationary writing mechanism. In such apparatus motion of the photochromic is typically provided by coating it on a movable transparent substrate such as a rotating disc or an endless belt. Time sequenced information bits are then recorded on successive photochromic segments. As the writing rate increases the writing lamp is flashed on for correspondingly shorter time intervals so the photochromic must move fast enough to preclude successive signals from being superimposed thereon but not so fast that a recorded segment is unduly lengthened, thereby reducing the information density. In addition, since the photochromic responds to the light energy, that is the product of the light intensity and its time duration, the intensity of the writing beam must be increased in proportion to the decrease in its duration to maintain writing capability. Available light sources, with the exception of the laser, however, emit light beams of rather limited intensity thus making it necessary to focus the writing beam on the photochromic. This enhances not only the capability for writing but also the writing density. Likewise, to readout the recorded data it is generally required that the reading beam be focussed on the photochromic to assure that successive information bits are read out separately and in the proper time sequence. Erasing, on the other hand, may be performed merely by flooding the recorded segments with a low intensity light beam having a comparatively long time duration.

Referring to the figure and disregarding the dashed line portions thereof for the moment, a photochromic dye 10 coated on a disc-shaped substrate 11 constructed of a material such as glass or quartz constitutes a recording medium. The xenon arc lamp 12 and lens 13 comprise a writing mechanism and ultraviolet light source 14 functions as an erase mechanism. At the beginning of a data processing operation light source 14 is energized causing ultraviolet rays to illuminate area 15 of the recording medium and drive the photochromic to its opaque state. As the recording medium rotates about axis 16 all segments in the annular band 17 pass the erasing mechanism so that eventually the entire band becomes opaque. Information may then be written on the recording medium by the xenon arc lamp which emits a yellow light beam having an intensity proportional to the amplitude of the signal applied to its input terminal 18. Lens 13 focusses the writing beam on the recording medium causing the photochromic to be driven toward its transparent state in proportion to the instantaneous amplitude of the input signal so that the recorded information appears as segments of varying transparency inscribed in the opaque annular band.

Glow modulators, lasers or other light sources which can be modulated to produce a light beam of varying intensity may be used in place of the xenon arc lamp and in the case of a laser, which emits a highly directional beam, the focussing lens most likely will not be required.

Constant intensity light sources may also be used in combination with a shutter mechanism disposed between the light source and recording medium to provide the variable intensity writing beam. In any case though if writing is accomplished by driving the photochromic from the opaque to the transparent state, either a yellow light source or one from which yellow can be filtered must be used.

In operating the device as a continuous exponential weighting integrator, the recording medium is continuously rotated about axis 16 in a clockwise direction so that time sequential information applied to the input terminal of the glow modulator is written on successive segments around the annular band and the intensity of the erasing mechanism is adjusted to erase partially the recorded information on each segment before it returns to a position adjacent the writing mechanism. Since the period of the input signal is synchronous with the rotation rate of the photochromic disc, the recorded signal eventually accumulates on a particular segment of the annular band, thus driving it to the transparent state. The recorded information is read out by means of the green light source 19, lens 20 and photodetector 21 comprising a read mechanism. The constant intensity green light beam emitted from source 19 is focussed by lens 20 onto the annular band of the photochromic disc through which it propagates onto photodetector 21. In some cases diffraction effects might make it advisable to incorporate a second lens between the disc and the photodetector to collect the light transmitted through the disc and focus it on the photodetector. The instantaneous intensity of the beam impinging on the photodetector is therefore proportional to the relative transparency of the photochromic segment positioned between the lens and photodetector at each instant. Consequently, the electrical signal produced at the output of the photodetector has an amplitude corresponding to that of the signal written on the recording medium.

The operation of the invention will be understood more thoroughly by considering the following example in which it is assumed that the erase mechanism reduces the amplitude of the recorded signal by 50% during each rotation of the disc. At time $T_1$ if signal $A_1$ is applied to the input of the glow modulator and unity gain exists through the write and read mechanisms, a signal $A_1$ will be read out shortly thereafter at the output terminal of photodetector 21 when the recorded segment passes the read mechanism. Thereafter, the recorded information will be reduced to $.5A_1$ and returned to the write position where at time $T_2$ signal $A_2$ will be added to it so that the recorded signal and corresponding read out signal will be $A_2+.5A_1$ which is subsequently reduced by the erase mechanism to $.5A_2+.25A_1$ before it is fed back to the write position where at time $T_3$ signal $A_3$ is added thereto to form a recorded signal $A_3+.5A_2+.25A_1$ which in turn will be read, attenuated and added to a signal applied to the write mechanism at time $T_4$. It is thus seen that the older information, namely, $A_1$ and $A_2$, becomes less significant as time elapses and that the processor provides continuous exponential weighting. At any time the writing mechanism may be deenergized to permit the annular band on the photochromic to be restored to the opaque state in preparation for the start of a new integration process. Although 50% erasure was assumed in the foregoing example, it should be understood that for various applications the erase mechanism might typically be adjusted to provide anywhere from approximately 50% to 10% erasure which corresponds to 50% up to 90% of the recorded signal being fed back to be added to an instant input signal but the feedback is not in anyway restricted to these percentages.

In addition to the opto-mechanical feedback provided by partial erasure and rotation of the recording medium other embodiments may be constructed wherein electrical feedback is provided by reading out the recorded information, attenuating it and then feeding it back to an amplifier at the input of the write mechanism in which it is either added to or subtracted from the instant input signal depending on whether the written information is or is not erased from the recording medium. If erasing is not employed, it is obvious, of course, that the recording medium need not be bistable but then the recording material cannot be used repetitively. When electrical feedback is used, however, means must be incorporated to assure that the feedback signal is synchronous with the input signals. For example, exponentially weighted integration may be achieved by removing the input signal from terminal 18 of the xenon arc lamp and connecting it instead on lead 22 to the input of summing amplifier 23 wherein it is added to the readout signal which is fed back to the summing amplifier on lead 24, the output of the summing amplifier being connected by lead 25 to the input of the xenon arc lamp. In this device, the recorded signal is completely erased after it is read out on each rotation of the disc and operation proceeds as follows. Assuming the feedback signal gain in summing amplifier 23 is equal to .5 while unity gain exists for the input signal through the summing amplifier and writing mechanism to the output of the read mechanism, at time $T_1$ input signal $A_1$ will be recorded and subsequently read out and completely erased. The readout signal $A_1$ is then reduced to $.5A_1$ upon feeding back through the summing amplifier in which it is added to signal $A_2$ at time $T_2$ so that the updated write and read signals become $A_2+.5A_1$. Operation continues in this manner with the older signals continuously being reduced and added to full strength current information. In this device, however, the rotation rate of the disc is made less than the period of the input signal and the spacing between the write and read mechanisms is adjusted to assure that the readout signal is fed back to the summing amplifier in time coincidence with the input signals without the necessity for incorporating a time delay mechanism in the feedback line.

If the input signal is a train of pulses for which not only the repetition rate but also the precise time of occurrence is known, a stationary recording medium may be employed. In this case, the write, read and erase light sources would not be energized continuously. Instead, each light source would be activated in sequence and focussed on the recording segments by means of lenses and beam splitters, the feedback being provided by only partially erasing the recorded information each time the erase lamp is activated so that the next time the write lamp is activated the present input signal is added to the unerased remnant of the recorded signal.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An electro-optical exponential weighting integrating apparatus comprising
   - (a) an optical recording medium,
   - (b) means for writing a signal on the recording medium, and
   - (c) means for feeding back the recorded signal in time coincidence with an instant input signal applied to the writing means such that in conjunction with the instant input signal it produces an updated recorded signal.

2. The apparatus of claim 1 wherein the recording means is bistable.

3. The apparatus of claim 1 wherein the optical recording medium is movable so that a segment thereof recurrently moves past the writing means with a periodicity equal to that of the signal applied to the writing means and the feedback means includes means for reading out the integrated signal written on the recording medium, means for summing the readout integrated signal with the input signal, and means connected between the read means and the summing means for adjusting the amplitude of the feedback signal.

4. The apparatus of claim 3 wherein the feedback means further includes means for erasing the integrated signal from the recording medium during the time interval that a recorded segment is moving from a position adjacent the reading means to a position adjacent the writing means.

5. The apparatus of claim 1 wherein (a) the optical recording medium is bistable and movable so that a recorded segment thereof travels past the writing means recurrently in synchronism with the period of the input signal applied thereto, and (b) the feedback means includes erasing means for attenuating the amplitude of the recorded signal by a predetermined percentage during each period plus means for recurrently positioning the amplitude attenuated signal adjacent the writing mechanism whereat an instant input signal applied to the writing means is added to it.

6. The apparatus of claim 5 and further including means for reading the signal on the recording medium.

7. The apparatus of claim 5 wherein (a) the recording medium is characterized by not only its sensitivity to radiant energy of first and second prescribed wavelengths which affect its relative opacity but also its insensitivity to radiant energy of a third prescribed wavelength, (b) the write means is a source of radiant energy of a first prescribed wavelength, and (c) the erase means is a source of radiant energy of a second prescribed wavelength.

8. The apparatus of claim 7 and further including read means comprising (a) a source of radiant energy of a third prescribed wavelength positioned adjacent one side of the recording medium to illuminate the recorded signals, and (b) a photodetector positioned on the other side of the recording medium to provide an electrical signal representative of the magnitude of the radiant energy propagating therethrough from the third source of radiant energy.

9. The apparatus of claim 8 and further including means for focussing the energy from the first and third radiant energy sources on the recording medium.

10. The apparatus of claim 9 wherein the recording medium comprises a photochromic dye coated on a transparent substrate.

References Cited

UNITED STATES PATENTS

| | | | |
|---|---|---|---|
| 2,742,631 | 4/1956 | Rajchman et al. | 250—71 |
| 2,756,343 | 7/1956 | Johnson | 250—65 |
| 2,794,945 | 6/1957 | Celmer | 250—71 |

JAMES W. LAWRENCE, *Primary Examiner.*

W. J. SCHWARTZ, *Assistant Examiner.*